(12) United States Patent
Lee

(10) Patent No.: US 10,764,583 B2
(45) Date of Patent: Sep. 1, 2020

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/328,858

(22) PCT Filed: Aug. 31, 2017

(86) PCT No.: PCT/KR2017/009526
§ 371 (c)(1),
(2) Date: Feb. 27, 2019

(87) PCT Pub. No.: WO2018/044088
PCT Pub. Date: Mar. 8, 2018

(65) Prior Publication Data
US 2019/0191163 A1     Jun. 20, 2019

(30) Foreign Application Priority Data
Aug. 31, 2016 (KR) .................. 10-2016-0112127

(51) Int. Cl.
*H04N 19/124* (2014.01)
*H04N 19/96* (2014.01)
(Continued)

(52) U.S. Cl.
CPC ......... *H04N 19/124* (2014.11); *H04N 19/103* (2014.11); *H04N 19/119* (2014.11);
(Continued)

(58) Field of Classification Search
CPC .. H04N 19/124; H04N 19/174; H04N 19/119; H04N 19/196; H04N 19/44
See application file for complete search history.

(56) References Cited

U.S. PATENT DOCUMENTS 9,300,973 B2     3/2016 Lee et al.
2013/0003828 A1  1/2013 Cohen et al.
(Continued)

FOREIGN PATENT DOCUMENTS

KR    10-2015-0004484 A    1/2015
WO    2013/129822 A1       9/2013
(Continued)

OTHER PUBLICATIONS

Jianle Chen et al., "Algorithm Description of Joint Exploration Test Model 2", Document: JVET-B1001_V1, Joint Video Exploration Team (JVET) of ITU-T SG 16 WP 3 and ISO/IEC JTC 1/SC 29/WG 11, 2nd Meeting: San Diego, USA, Feb. 20-26, 2016.
(Continued)

*Primary Examiner* — Nam D Pham
(74) *Attorney, Agent, or Firm* — IP Legal Services, LLC

(57) ABSTRACT

A method for decoding a video according to the present invention may comprise: deriving a spatial merge candidate for a current block, generating a merge candidate list for the current block based on the spatial merge candidate, obtaining motion information for the current block based on the merge candidate list, and performing motion compensation for the current block based on the motion information. Herein, if the current block does not have a pre-defined shape or a size equal to or greater than a pre-defined size, the spatial merge candidate of the current block may be derived based on a block which have the pre-defined shape or a size equal to or greater than the pre-defined size, the block including the current block.

11 Claims, 6 Drawing Sheets

(51) Int. Cl.
*H04N 19/60* (2014.01)
*H04N 19/103* (2014.01)
*H04N 19/44* (2014.01)
*H04N 19/196* (2014.01)
*H04N 19/119* (2014.01)
*H04N 19/174* (2014.01)
*H04N 19/13* (2014.01)
*H04N 19/159* (2014.01)
*H04N 19/176* (2014.01)

(52) U.S. Cl.
CPC ........... *H04N 19/13* (2014.11); *H04N 19/159* (2014.11); *H04N 19/174* (2014.11); *H04N 19/176* (2014.11); *H04N 19/196* (2014.11); *H04N 19/44* (2014.11); *H04N 19/60* (2014.11); *H04N 19/96* (2014.11)

(56) References Cited

U.S. PATENT DOCUMENTS

| | | |
|---|---|---|
| 2014/0269915 A1 | 9/2014 | Lee et al. |
| 2015/0078441 A1 | 3/2015 | Han et al. |
| 2015/0139300 A1 | 5/2015 | Lee et al. |
| 2015/0139306 A1 | 5/2015 | Lee et al. |
| 2015/0189289 A1 | 7/2015 | Kim et al. |
| 2016/0165253 A1 | 6/2016 | Lee et al. |
| 2016/0165254 A1 | 6/2016 | Lee et al. |
| 2016/0219290 A1* | 7/2016 | Zhao ................ H04N 19/159 |
| 2016/0269730 A1 | 9/2016 | Jeon et al. |
| 2016/0381362 A1 | 12/2016 | Lee et al. |
| 2016/0381364 A1 | 12/2016 | Han et al. |
| 2017/0099502 A1 | 4/2017 | Lee et al. |
| 2017/0099503 A1 | 4/2017 | Lee et al. |
| 2017/0099504 A1 | 4/2017 | Lee et al. |
| 2017/0223380 A1 | 8/2017 | Lee et al. |
| 2018/0054621 A1 | 2/2018 | Kim et al. |
| 2018/0167612 A1 | 6/2018 | Lee et al. |
| 2018/0310003 A1 | 10/2018 | Kim et al. |
| 2018/0310004 A1 | 10/2018 | Kim et al. |
| 2018/0310005 A1 | 10/2018 | Kim et al. |
| 2018/0310006 A1 | 10/2018 | Kim et al. |
| 2018/0310007 A1 | 10/2018 | Kim et al. |

FOREIGN PATENT DOCUMENTS

| | | |
|---|---|---|
| WO | 2014/007520 A1 | 1/2014 |
| WO | 2015/012600 A1 | 1/2015 |

OTHER PUBLICATIONS

V. Lorcy et al., "Proposed improvements to the Adaptive multiple Core transform", Document: JVET-C0022, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-4.

European Patent Office, Extended European Search Report of corresponding EP Patent Application No. 17847013.4, dated Apr. 14, 2020.

Jianle Chen et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

Vivienne Sze et al., "High Efficiency Video Coding (HEVC)", Algorithms and Architectures, Springer International Publishing, Switzerland, 2014.

* cited by examiner

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2017/009526 (filed on Aug. 31, 2017) under 35 U.S.C. § 371, which claims priority to Korean Patent Application No. 10-2016-0112127 (filed on Aug. 31, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently performing a transform/inverse transform in encoding/decoding a video signal.

An object of the present invention is to provide a method and an apparatus for adaptively determining a transform type of a current block among a plurality of transform type candidates in encoding/decoding a video signal.

An object of the present invention is to provide a method and an apparatus for determining transform types of a horizontal transform and a vertical transform separately in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may obtain a transform coefficient of a current block, inverse quantize the transform coefficient, determine a transform set for the current block, determine one of a plurality of transform type candidates as a transform type of the current block, and inverse transform the inverse quantized transform coefficient based on the determined transform type.

A method and an apparatus for encoding a video signal according to the present invention may obtain a transform coefficient of a current block, inverse quantize the transform coefficient, determine a transform set for the current block, determine one of a plurality of transform type candidates as a transform type of the current block, and inverse transform the inverse quantized transform coefficient based on the determined transform type.

In the method and the apparatus for encoding/decoding a video signal according to the present invention, the transform set of the current block may be determined based on index information indicating at least one among a plurality of transform sets.

In the method and the apparatus for encoding/decoding a video signal according to the present invention, at least one of a type or a number of a transform type candidate for each of the plurality of transform set may be different.

In the method and the apparatus for encoding/decoding a video signal according to the present invention, at least one of a type or a number of a transform type candidate included in the transform set may be determined differently according to whether a transform skip is allowed or not.

In the method and the apparatus for encoding/decoding a video signal according to the present invention, the inverse transform may comprise a horizontal transform and a vertical transform and a transform set for the horizontal transform and a transform set for the vertical transform may be determined independently.

In the method and the apparatus for encoding/decoding a video signal according to the present invention, the transform set for the horizontal transform and the transform set for the vertical transform may be determined according to an intra prediction mode of the current block.

In the method and the apparatus for encoding/decoding a video signal according to the present invention, the transform type of the current block may be adaptively determined based on at least one of a size, a shape or a number of samples of the current block.

The features briefly summarized above for the present invention are only illustrative aspects of the detailed description of the invention that follows, but do not limit the scope of the invention.

Advantageous Effects

According to the present invention, a transform/inverse transform for an encoding/decoding target block can be performed efficiently.

According to the present invention, a transform type of a current block can be determined adaptively among a plurality of transform type candidates.

According to the present invention, transform types of a horizontal transform and a vertical transform can be determined separately.

The effects obtainable by the present invention are not limited to the above-mentioned effects, and other effects not mentioned can be clearly understood by those skilled in the art from the description below.

MODE FOR INVENTION

Figure 1:
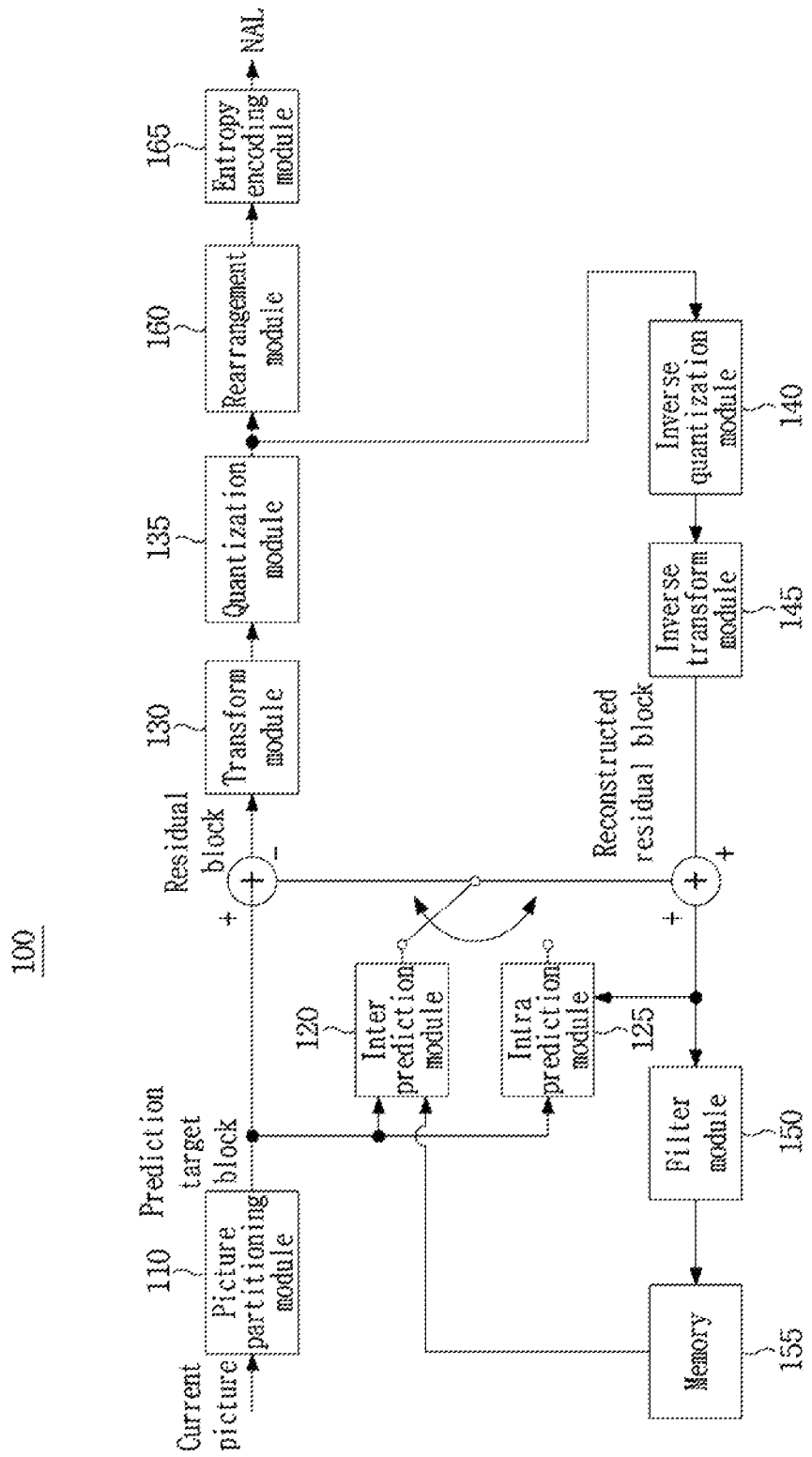
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in a unit of a ¼ pixel. In the case of chroma signals, a 4-tap DCT-based interpolation filter having different filter coefficient may be used to generate pixel information of an integer pixel or less than an integer pixel in a unit of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in a unit of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in a unit of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
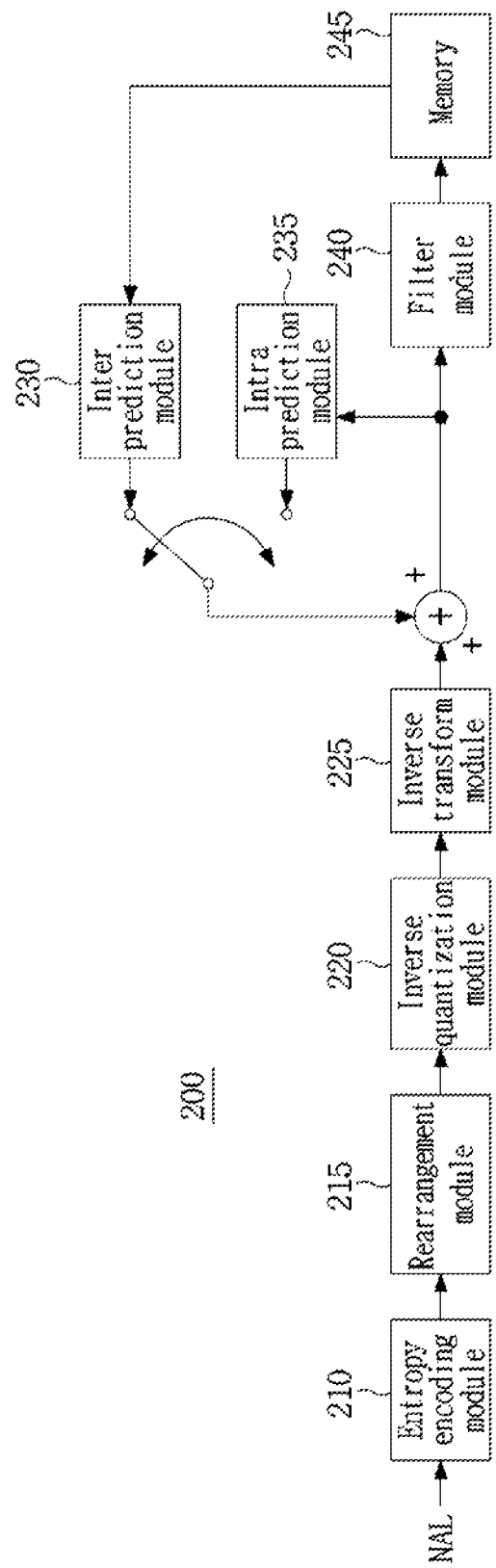
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
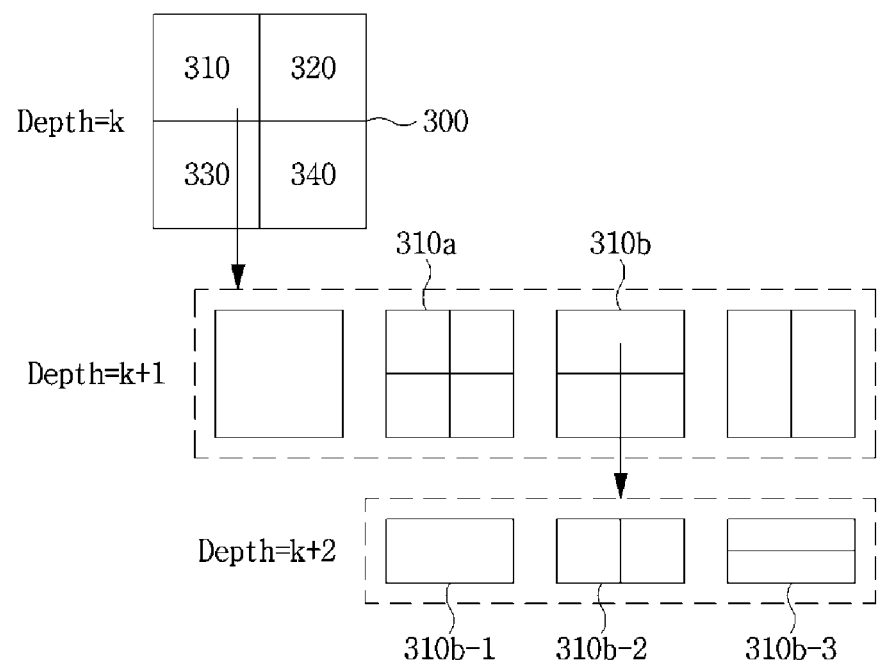
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in a unit of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
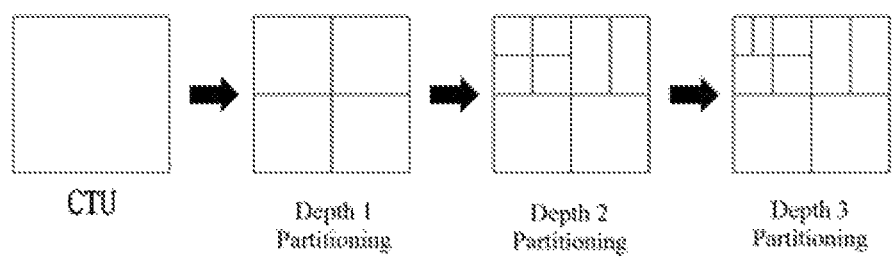
FIGS. 5A and 5B are diagrams illustrating an example in which only a binary tree-based partition of a predetermined type is allowed according to an embodiment of the present invention.
Figure 5B:
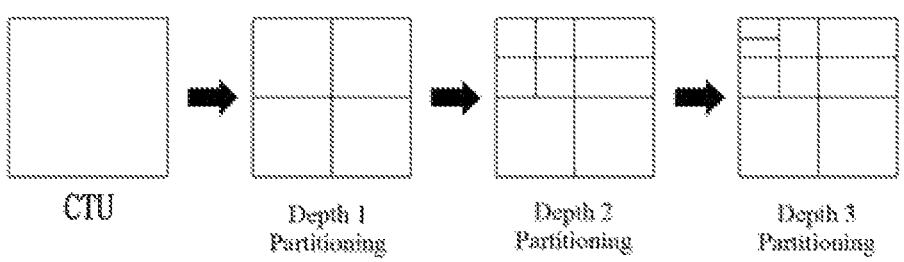

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in a unit of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus+1 may indicate the maximum depth at which the binary tree partitioning is allowed.

Figure 6:
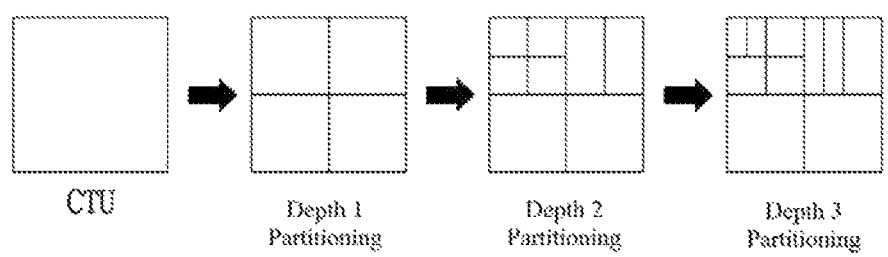
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in a unit of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
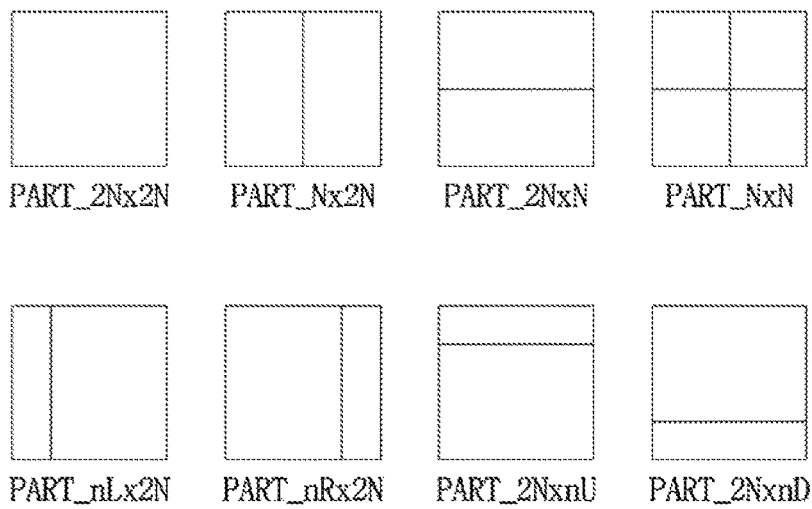
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
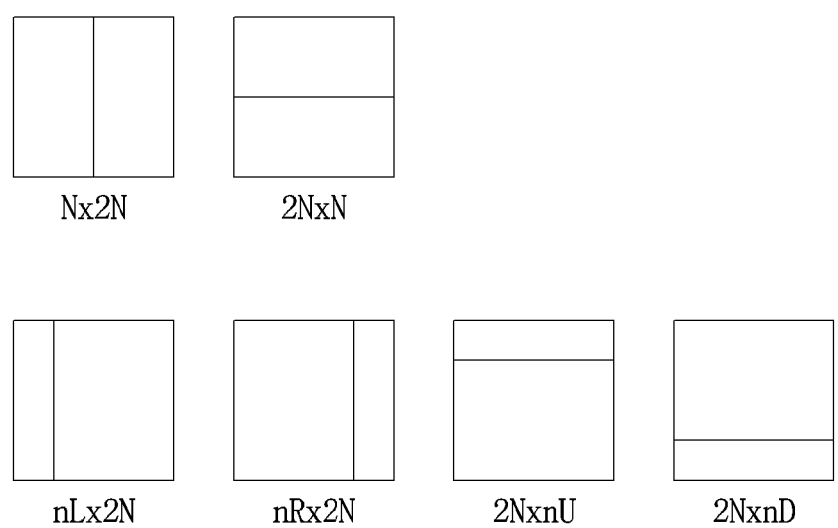
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
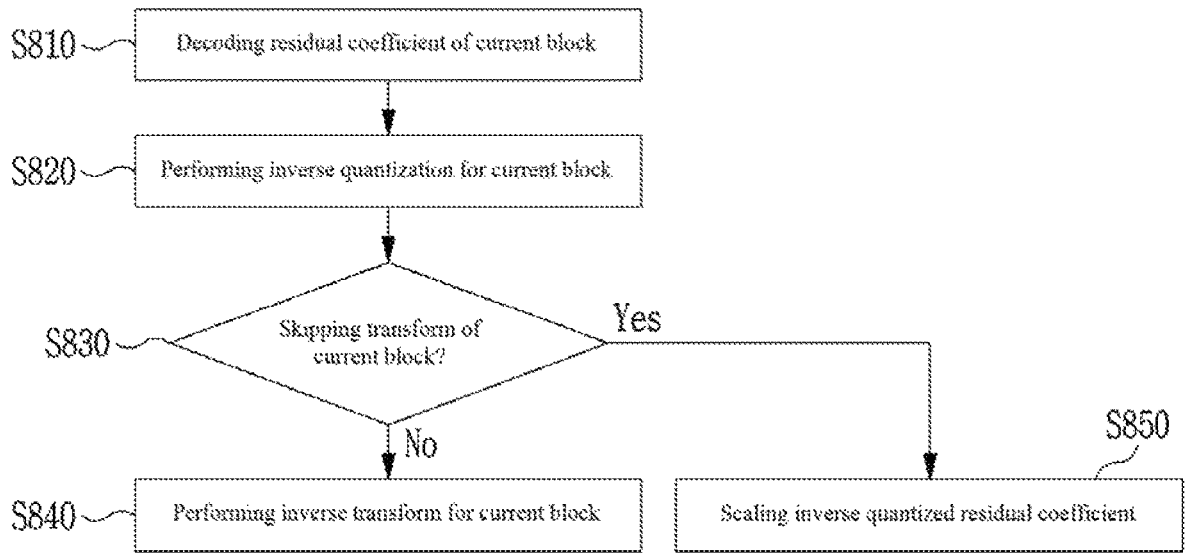
FIG. 8 is a flowchart illustrating processes of obtaining a residual sample according to an embodiment of the present invention.

FIG. 8 is a flowchart illustrating processes of obtaining a residual sample according to an embodiment of the present invention.

First, a residual coefficient of a current block may be obtained S810. The decoder may obtain the residual coefficient through a coefficient scanning method. For example, the decoder may perform coefficient scanning using a diagonal scan, a zigzag scan, an up-right scan, a vertical scan, or a horizontal scan, and thereby obtain residual coefficients in a shape of a two-dimensional block.

Inverse quantization may be performed for the residual coefficient of the current block S820.

It is possible to determine whether to skip an inverse transform on the dequantized residual coefficient of the current block S830. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S840. Here, the inverse transform may be performed using at least one of DCT, DST, and KLT.

When the inverse transform is skipped in both the horizontal direction and the vertical direction of the current block, the inverse transform is not performed in the horizontal direction and the vertical direction of the current block. In this case, the residual sample of the current block may be obtained by scaling the dequantized residual coefficient with a predetermined value S850.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

If it is determined to apply the inverse transform to the current block, a transform type may be determined and the inverse transform may be performed using the determined transform type. The transform type of the current block (e.g., a transform block or a coding block) may be determined based on at least one of a size or an encoding mode of the current block. Here, the encoding mode may indicate whether a prediction block corresponding to the coding block or the transform block is encoded in intra mode or inter mode.

For example, the inverse transform for a block of 4×4 encoded in the intra mode may be performed by using DST (specifically, DST-VII), and the inverse transform for a block other than the block may be performed by using DCT (specifically, DCT-II).

DST-VII may be defined as matrix $A_4$ of Equation 1. The inverse transform of DST-VII may be defined as $A_4^T$.

$$A_4 = \begin{bmatrix} 29 & 55 & 74 & 84 \\ 74 & 74 & 0 & -74 \\ 84 & -29 & -74 & 55 \\ 55 & -84 & 74 & -29 \end{bmatrix} \quad \text{[Equation 1]}$$

The DCT-II for a block of 8×8 may be defined as matrix $T_8$ of Equation 2. The inverse transform of DCT-II may be defined as $T_B^T$.

$$T_8 = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{bmatrix} \quad \text{[Equation 2]}$$

A condition for selecting the transform type may be set differently on a unit of a sequence, a slice or a block. For example, in slice 0, DST is applied to a transform block of 4×4 encoded in the intra mode, whereas in slice 0, DST is applied to a transform block of 8×8 or smaller encoded in the intra mode.

As another example, the transform type of the current block may be adaptively determined based on at least one of an intra prediction mode of the current block or the number of samples included in the current block. At this time, the number of samples used as a reference for selecting the transform type may have a fixed value or may be determined through information signaled via the bitstream. The information may be signaled via a block level, a slice header, or a picture parameter set.

For example, DST may be applied only when the current block includes 16 or less samples and when the current block is encoded in the intra mode, and DCT may be applied in other cases. Specifically, DST may be applied to a block of 4×4, 2×8 or 8×2 encoded by the intra prediction, and DCT may be applied to a block other than the block.

Alternatively, the transform type of the current block may be determined from transform set candidates included in a transform set. At this time, different transform sets can be used in a unit of a coding block or a transform block. Alternatively, a plurality of transform blocks included in a predetermined coding block may share the same transform set. To determine the transform set, index information for identifying the transform set may be signaled in a unit of a coding block or a transform block. Alternatively, the transform set of the current block may be adaptively determined according to a size, a shape, an encoding mode, an intra prediction mode, the number of samples of the current block, or the like.

The transform set may include a plurality of transform type candidates that may be selectively used according to the shape, the size, or the number of samples of the transform block (or the coding block). At this time, at least one of the number or types of transform type candidates included in transform sets may be different.

Table 1 is a chart depicting transform sets including different transform type candidates.

TABLE 1

| Transform set Index | Transform candidates 0 | Transform candidates 1 |
|---|---|---|
| 0 | DST-VII | DCT-II |
| 1 | DST-VII | DST-I |
| 2 | DST-VII | DCT-VIII |

In Table 1, it is illustrated that the number of transform type candidates included in the transform set is two. It is also possible that the transform set includes one, three, four or more transform type candidates.

In addition, the number of transform type candidates included in at least one of the transform sets may be different from the number of transform type candidates included in another transform set. The number of maximum transform type candidates included in the transform set may be signaled in a slice or a sequence header.

The transform type of the current block may be determined to be at least one of the transform type candidates included in the transform set. At this time, the transform type of the transform block may be determined based on a size, an encoding mode, an intra prediction mode, the number of samples of the transform block or the coding block, or the like. Here, the intra prediction mode of the transform block may be the intra prediction mode of the prediction block or the coding block corresponding to the transform block.

For example, when transform set index 0 is determined as the transform set of the current block, if the current block is a 4×4 block encoded in the intra mode, transform type candidate 0, i.e., DST-VII is used, and if the current block does not satisfy the above condition, transform type candidate 1, i.e. DCT-II, is used.

Alternatively, when transform set index 2 is determined as the transform set of the current block, if the current block is 4×4 or 8×8 block encoded in the intra mode, transform type candidate 0, i.e., DST-VII is applied, and if the current block does not satisfy the above condition, transform type candidate 1, i.e., DCT-VIII, is used.

According to a size of the coding block, a condition for selecting the transform type candidate of the transform block may be set differently. For example, when the size of the coding block is smaller than or equal to 32×32, transform type candidate 0 is applied to a transform block of 4×4 encoded in the intra mode, and transform type candidate 1 is applied to a transform block which does not satisfy the above conditions. On the other hand, when the size of the coding block is larger than 32×32, transform type candidate 0 is applied to a block of 4×4 or 8×8 encoded in the intra mode, and transform type candidate 1 is applied to a transform block which does not satisfy the above conditions.

The transform type candidate may include a transform skip indicating that no transform is performed. Depending on whether a transform skip is allowed, at least one of types or the number of transform type candidates included in the transform set may be set differently. As an example, if the transform_skip_enabled_flag indicating whether or not to allow the transform skip in a picture is 1, a transform set which further including the transform skip as the transform type candidate may be used, as shown in Table 2. On the other hand, if transform_skip_enabled_flag is 0, a transform set which does not include the transform skip as the transform type candidate may be used, as shown in Table 1.

TABLE 2

| Transform set Index | Transform candidates 0 | Transform candidates 1 | Transform candidates 2 |
| --- | --- | --- | --- |
| 0 | DST-VII | DCT-II | Transform skip |
| 1 | DST-VII | DST-I | Transform skip |
| 2 | DST-VII | DCT-VIII | Transform skip |

Transform types of a horizontal transform and a vertical transform of the current block may be the same, or transform types of the horizontal transform and the vertical transform may be different from each other. For example, a transform type candidate in the transform set may be applied to both the horizontal transform and the vertical type, or a different transform type candidate may be applied to each of the horizontal transform and the vertical type.

As another example, transform sets for the horizontal transform and the vertical transform of the current block may be the same, or transform sets of the horizontal transform and the vertical transform may be different from each other. When different transform sets are used for the horizontal transform and the vertical transform, a transform set index for identifying the transform set for the horizontal transform and a transform set index for identifying the transform set for the vertical transform may be individually signaled.

For example, a transform set corresponding to index 0 may be used for the horizontal transform, and a transform set corresponding to index 1 may be used for the vertical transform. If the current block is 4×4 encoded with the intra prediction, the vertical transform and the horizontal transform may use the transform type candidate 1 included in each transform set. Accordingly, DST-II may be used for the horizontal transform and DST-I may be used for the vertical transform.

It may be determined whether to use the same transform set for the horizontal transform and the vertical transform depending on an intra prediction mode of the current block. For convenience of explanation, the transform set for the horizontal transform will be referred to as a horizontal direction transform set, and the transform set for the vertical transform will be referred to as a vertical direction transform set.

For example, when the intra prediction mode of the current block is similar to a horizontal direction or similar to a vertical direction, the horizontal transform and the vertical transform may use different transform sets. Here, the intra prediction mode similar to the horizontal direction may include at least one of the vertical direction or intra prediction modes in which a difference in mode value from the intra prediction mode of the vertical direction is less than a predefined value. In addition, the intra-prediction mode similar to the vertical direction may include at least one of the horizontal direction or intra prediction modes in which the difference in mode value from the intra prediction mode of the horizontal direction is less than a predefined value. On the other hand, when the intra prediction mode of the current block is a non-directional mode or a directional mode which does not satisfy the above condition, the vertical transform and the horizontal transform may use the same transform set. Alternatively, it is also possible to use different transform sets for the vertical direction and the horizontal transform of the current block when the intra prediction mode of the current block is the non-directional mode.

Figure 9:
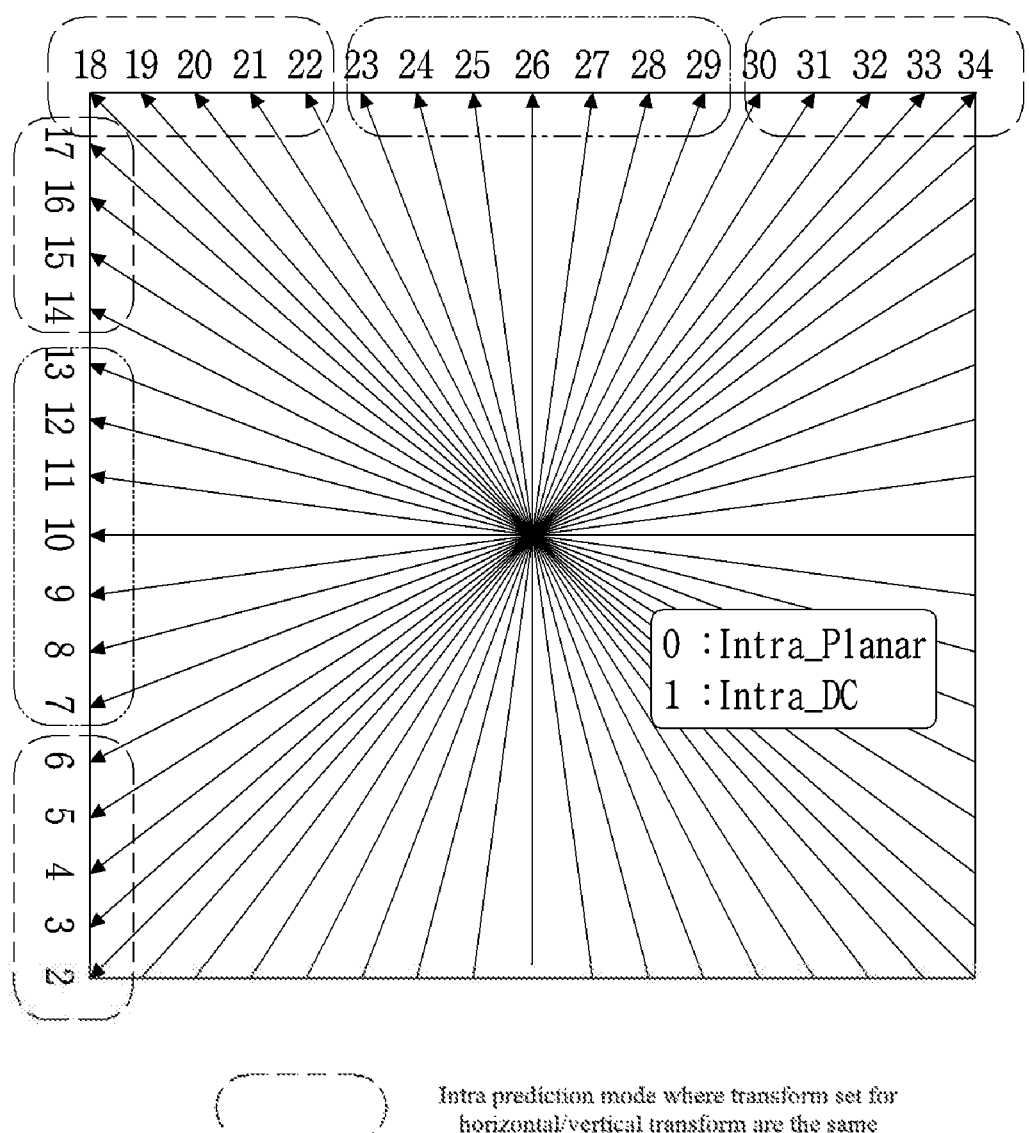
FIG. 9 is a diagram illustrating, for 33 intra prediction modes, whether a vertical transform and a horizontal transform use the same transform set.

FIG. 9 is a diagram illustrating, for 33 intra prediction modes, whether a vertical transform and a horizontal transform use the same transform set. In the example shown in FIG. 9, it is depicted that the vertical and horizontal transforms use different transform sets when the intra prediction mode of the current block is included in a range of 7-13 or 23-29. On the other hand, it is depicted that the same transform set is applied to the vertical transform and the horizontal transform when the intra prediction mode of the current block is a directional mode not included in the above range.

If there exists a block having the same intra prediction mode as the current block in a predetermined unit block, the transform set of the current block may be set to be the same as the transform set of the block having the same intra prediction mode as the current block. Here, the predetermined unit block may be a coding block, a coding tree block, or a block having a predetermined size.

For example, it will be assumed that an intra prediction mode corresponding to a first transform block in a scanning order in a coding block has a vertical direction (for example, mode number 26), a horizontal direction transform set of the block is index 2, and a vertical direction transform set of the block is index 0. If there is more transform block having an intra prediction mode of the vertical direction in the coding block (i.e., a transform block corresponding to a prediction block having the intra prediction mode of the vertical direction), a transform set index value is not signaled for the newly scanned transform block. Instead, the transform set of the previously scanned transform block having the intra prediction mode of vertical direction is applied as a transform set of the newly scanned transform block. That is, a horizontal direction transform set of the newly scanned transform block is determined as the index 2, and a vertical direction transform set is determined as the index 0.

As another example, when there is a block having an intra prediction mode similar to the current block in a predetermined unit block, the transform set of the current block may be set to be the same as the transform set of the block having the intra prediction mode similar to the current block. Here, the intra prediction mode similar to the current block may include intra prediction modes within a predetermined range from a reference intra prediction mode. For example, when the reference intra prediction mode is a horizontal direction or a vertical direction, the reference intra prediction mode and the intra prediction modes within ±a from the intra prediction mode of the horizontal direction or the vertical direction may be determined to be mutually similar.

For example, it will be assumed that an intra prediction mode corresponding to a first transform block in a scanning order in a coding block has a vertical direction (for example, mode number 26), a horizontal direction transform set of the block is index 2, and a vertical direction transform set of the block is index 0. When there exists a transform block having an intra prediction mode similar to the vertical direction (e.g., mode number 27) in the coding block (i.e., a transform block corresponding to a prediction block having the vertical intra prediction mode), a transform set index value may not be signaled for the newly scanned transform block. Instead, a transform set of the transform block having the intra prediction mode that is similar to the intra prediction mode of the current block may be applied as the transform set of the newly scanned transform block. That is, a horizontal direction transform set of the newly scanned transform block is determined as the index 2, and a vertical direction transform set may be determined as the index 0.

At least one of a horizontal direction transform set or a vertical direction transform set of the current block may be determined based on an intra prediction mode of the current block. For example, Table 3 shows an example in which a fixed transform set index is assigned according to the intra prediction mode of the current block.

TABLE 3

| | Intra Mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| H | 2 | 1 | 0 | 1 | 0 | 1 | 0 | 1 | 0 | 0 | 0 | 0 | 0 | 1 | 0 | 1 | 0 | 1 |
| V | 1 | 1 | 0 | 1 | 0 | 1 | 0 | 1 | 2 | 2 | 2 | 2 | 2 | 1 | 0 | 1 | 0 | 1 |

| | Intra Mode | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

When the current block is encoded with the inter prediction, a predefined transform set may be used for the current block. For example, if the current block is encoded with the inter prediction, a transform set corresponding to index 0 may be used for the current block.

Alternatively, when the coding block is encoded with the inter prediction, a transform set is selected for the coding block, and transform blocks included in the coding block may use transform type candidates included in the transform set of the coding block. At this time, the transform type of each transform block may be determined by a size or a shape of the transform block, or information for identifying the transform type selected for each transform block may be signaled through the bitstream.

The determination of at least one of a plurality of transform type candidate groups as the transform type of the current block may be defined as AMT (Adaptive Multiple Transform). The adaptive multiple transform (AMT) may be applied to a coding block of a specific size or a coding block of a specific shape. At this time, information on the size or the shape of the coding block to which the adaptive multiple transform can be applied may be signaled through the bitstream. Here, the information on the size of the coding block may indicate at least one of a maximum size or a minimum size. In addition, the information may be signaled through at least one of a block level, a slice header, or a sequence header.

Different transforms may be selectively used based on different size/shape in a unit of a slice or a block.

For example, in slice 0, DST may be used when the transform block is encoded in the intra prediction mode and a size of the transform block is 4×4, and DCT may be used in other cases. In slice 1, DST may be used when the transform block is encoded in the intra prediction mode and a size of the transform block is less than or equal to 8×8, and DCT may be used in other cases.

Different transforms may be selected based on at least one of an intra prediction mode and the number of samples in the transform block. Specifically, for example, when the transform block is encoded in the intra prediction mode and the number of samples in transform block is 16 or less, the transform may be performed using DST, and DCT may be used in other blocks.

Specifically, for example, when the transform block is encoded in the intra mode and the transform block is 2×8 or when the transform block is encoded in the intra mode and the transform block is 8×2, DST (Discrete Sine Transform) is used, and DCT-II (Discrete Cosine Transform) is used in other blocks.

At this time, a syntax, different type transform block selection indicator, indicating the number of samples in a block which is used as a reference for selecting different transforms may be signaled in a slice header or a picture parameter set.

Conditions for selecting transform type candidate 0 and conditions for selecting transform type candidate 1 may differ in a unit of a sequence, a slice, or a block. For example, in slice 0, the transform type candidate 0 is selected only for a transform block of 4×4 encoded in the intra mode, while in the slice 0, the transform type 0 is selected for a transform block of 8×8 or smaller encoded in the intra mode.

Alternatively, the transform type may be adaptively selected based on at least one of an intra prediction mode or the number of samples in a block. At this time, the number of samples in the block used as a reference for selecting the transform type may have a fixed value or may be determined through information signaled through the bitstream. The information may be signaled via a block level, a slice header, or a picture parameter set.

For example, DST may be applied only when the current block comprises 16 or less samples and when the current block is encoded in the intra mode, and DCT may be applied in other cases. Specifically, DST may be applied to a transform block of 4×4, 2×8 or 8×2 encoded in the intra prediction, and DCT may be applied to other blocks.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
obtaining a residual coefficient of a current block;
inverse quantizing the residual coefficient;
determining whether an inverse-transform is skipped for the current block; and
obtaining a residual sample of the current block by applying or skipping the inverse-transform for the current block,
wherein when it is determined that the inverse-transform is not skipped for the current block, obtaining the residual sample comprises:
determining a transform set for the current block;
determining a transform type of the current block among transform type candidates included in the transform set; and
performing the inverse-transform based on the determined transform type, and
wherein skipping the inverse-transform for the current block is not allowed when the current block is partitioned into vertically or horizontally.

2. The method of claim 1, wherein the transform set of the current block is selected among a plurality of transform set candidates, and
wherein a type or a number of transform type candidates included in one of the transform set candidates is different from another of the transform set candidates.

3. The method of claim 1, wherein the inverse transform comprises a horizontal inverse transform and a vertical inverse transform, and
wherein a transform set for the horizontal transform and a transform set for the vertical transform are determined independently.

4. The method of claim 3, wherein the transform set for the horizontal inverse transform and the transform set for the vertical inverse transform are determined according to an intra prediction mode of the current block.

5. The method of claim 1, wherein the transform type of the current block is adaptively determined based on at least one of a size, a shape or a number of samples of the current block.

6. A method for encoding a video, the method comprising:
obtaining a residual sample a current block;
determining whether a transform is skipped for the current block;
obtaining a residual coefficient of the current block by applying or skipping the transform for the current block; and
quantizing the residual coefficient of the current block,
wherein when it is determined that the transform is not skipped for the current block, obtaining the residual coefficient comprises:
determining a transform set for the current block;
determining a transform type of the current block among transform type candidates included in the transform set; and
performing the transform based on the determined transform type, and
wherein skipping the transform for the current block is not allowed when the current block is partitioned into vertically or horizontally.

7. The method of claim 6, wherein the transform set of the current block is selected among a plurality of transform set candidates, and
wherein a type or a number of transform type candidates included in one of the transform set candidates is different from another of the transform set candidate.

8. The method of claim 6, wherein the transform comprises a horizontal transform and a vertical transform, and
wherein a transform set for the horizontal transform and a transform set for the vertical transform are determined independently.

9. The method of claim 8, wherein the transform set for the horizontal transform and the transform set for the vertical transform are determined according to an intra prediction mode of the current block.

10. The method of claim 6, wherein the transform type of the current block is adaptively determined based on at least one of a size, a shape or a number of samples of the current block.

11. An apparatus for decoding a video, the apparatus comprising:
an entropy decoding unit to decode a residual coefficient of a current block;
an inverse quantization unit to inverse quantize the residual coefficient; and
an inverse transform unit to determine whether an inverse-transform is skipped for the current block, and to obtain a residual sample of the current block by applying or skipping the inverse-transform for the current block,
wherein when it is determined that the inverse-transform is not skipped for the current block, the inverse transform unit is further configured to:
determine a transform set for the current block,
determine a transform type of the current block among transform type candidates included in the transform set, and
performing the inverse transform based on the determined transform type, and
wherein skipping the inverse-transform for the current block is not allowed when the current block is partitioned into vertically or horizontally.

* * * * *